United States Patent
Lee (10) Patent No.: US 10,460,238 B2
(45) Date of Patent: Oct. 29, 2019

(54) DATA QUALITY ISSUE DETECTION THROUGH ONTOLOGICAL INFERENCING

(75) Inventor: Jason E. Lee, Collegeville, PA (US)

(73) Assignee: LEIDOS INNOVATIONS TECHNOLOGY, INC., Gaithersburg, MD (US)

( * ) Notice: Subject to any disclaimer, the term of this patent is extended or adjusted under 35 U.S.C. 154(b) by 568 days.

(21) Appl. No.: 13/270,945

(22) Filed: Oct. 11, 2011

(65) Prior Publication Data

US 2013/0091084 A1    Apr. 11, 2013

(51) Int. Cl.
*G06N 5/02* (2006.01)

(52) U.S. Cl.
CPC ..................................... *G06N 5/02* (2013.01)

(58) Field of Classification Search
None
See application file for complete search history.

(56) References Cited

U.S. PATENT DOCUMENTS

| | | |
|---|---|---|
| 6,640,231 B1 | 10/2003 | Andersen et al. |
| 7,209,923 B1 | 4/2007 | Cooper |
| 7,493,333 B2 | 2/2009 | Hill et al. |
| 7,685,140 B2 | 3/2010 | Jackson |
| 7,707,162 B2 | 4/2010 | Naphade et al. |
| 2003/0171876 A1 | 9/2003 | Markowitz et al. |
| 2011/0078164 A1 | 3/2011 | Faughnan |
| 2013/0006968 A1* | 1/2013 | Gusmini et al. ............... 707/722 |

OTHER PUBLICATIONS

Alsafi, Vyatkin, "Ontology-based Reconfiguration Agent for Intelligent Mechatronic Systems in Flexible Manufacturing", Robotics and Computer-Integrated Manufacturing, vol. 26, 2010, pp. 381-301.*

Erhard Rahm, Hong Hai Do, "Data Cleaning: Problems and Current Approaches", Journal: IEEE Data(base) Engineering Bulletin—DEBU, vol. 23, No. 4, 2000, pp. 3-13.*

Isabel F. Cruz, Huiyong Xiao, "The Role of Ontologies in Data Integration", Jounal of Engineering Intelligent Systems, vol. 13, No. 4, 2005, pp. 1-18.*

Ian Horrocks, Ulrike Sattler, "Ontology Reasoning in the SHOQ(D) Description Logic", In Proc. of the 17th Int. Joint Conf. on Artificial Intelligence (IJCAI 2001, pp. 1-6.*

Sean Bechhofer, Jeremy J. Carroll, "Parsing OWL DL: Trees or Triples?", Proceeding WWW '04 Proceedings of the 13th international conference on World Wide Web, 2004, pp. 266-275.*

(Continued)

*Primary Examiner* — Scott A. Waldron
*Assistant Examiner* — Michael Zidanic
(74) *Attorney, Agent, or Firm* — Oblon, McClelland, Maier & Neudstadt, L.L.P.

(57) ABSTRACT

Systems and methods (e.g., utilities) for use in providing automated data quality detection that can be used multiple times across various domains and across multiple data quality spheres. A data structure or schema of an incoming data set is initially mapped to a desired data or knowledge state in a domain ontology made up of a number of TBox statements. Data quality issues in the incoming data set can then be detected as instances of the incoming data set are attempted to be inferenced against or otherwise matched to anticipated TBox statements of the domain ontology.

13 Claims, 4 Drawing Sheets

(56) References Cited

OTHER PUBLICATIONS

Hong-Hai Doa, Erhard Rahm, "Matching large schemas: Approaches and evaluation", Information Systems, vol. 32, 2007, pp. 857-885.*
Hong-Hai Do, Erhard Rahm, "Matching large schemas: Approaches and evaluation", Information Systems, vol. 32, 2007, pp. 857-885.*
Zhao, Huang, "Study on Formal Reasoning in Metadata Integration Based on CWM", Proceedings of the Fifth International Conference on Machine Learning and Cybernetics, Dalian, Aug. 15, 2006, pp. 1493-1501.*
Oberle, "How Ontologies Benefit Enterprise Applications", "http://www.semantic-web-journal.net/content/how-ontologies-benefit-enterprise-applications-0/", Sep. 2011, pp. 1-19.*
Edhard Rahm, Hong Hai Do, "Data Cleaning: Problems and Current Approaches", Bulletin of the Technical Committee on Data Engineering, vol. 23, No. 4, Dec. 2000, pp. 3-13.*
Franz Weitl, Mirjana Jaksic, Burkhard Freitag, "Towards the Automated Verification of Semi-structured Documents", Data & Knwledge Engineering, vol. 68, 2009, pp. 292-317.*

* cited by examiner

DATA QUALITY ISSUE DETECTION THROUGH ONTOLOGICAL INFERENCING

FIELD OF THE INVENTION

The present invention relates generally to data collection and management and, more particularly, to the automated detection of data quality issues in data sets through the inferencing of data set instances into an acceptable state of knowledge.

BACKGROUND OF THE INVENTION

Poor data quality can be a vast and costly problem for entities that produce, transform, and leverage various types of data for both internal purposes and for associated customers. As the quantity of data produced and transmitted over communication networks continue to grow exponentially, manual data quality detection methods (e.g., inspection) often fails to discover underlying quality issues. While attempts have been made to implement automated data quality detection systems, automated solutions typically rely on tool-specific, proprietary formats and processes that are limited in their portability across disparate domains and are often complicated to design and administer.

SUMMARY OF THE INVENTION

It has been determined that automated data quality detection tools are needed that can be used multiple times across various domains and across multiple data quality spheres. In this regard, disclosed herein are systems, methods and the like (e.g., "utilities") that utilize standards-based manners of characterizing data which allows for use across multiple domains as opposed to proprietary, rules-based detection engines that are limited in their degree of portability across disparate data domains. The utilities disclosed herein utilize one or more ontologies, each of which expresses or otherwise represents a state of knowledge that is deemed to be acceptable in relation to data entering a domain (e.g., what the incoming data should look like which may be different than what it does look like).

Incoming data is initially mapped or otherwise linked to a particular ontology, and then data quality issues in instances of the incoming data can be detected based on results of attempts to inference each instance against an acceptable state of knowledge within the mapped ontology. Successful inferencing (e.g., matching) of an incoming data instance against an anticipated statement in the mapped ontology implies that the instance is likely free of data quality issues, while a failure to inference the instance against the anticipated statement likely implies that the instance is associated with one or more types of data quality issues, such as in relation to structure, format, ranges, and the like. The disclosed utilities can be utilized between almost any data source and any expected or acceptable state of knowledge and require decreased levels of preparation to allow for the monitoring of large amounts of incoming data to find data quality anomalies.

In one aspect, a utility for use in detecting data quality issues in one or more instances of an incoming set of data is disclosed. The utility includes determining a scope of an incoming data set to be receivable at a processing engine, and then obtaining a domain ontology that includes a plurality of TBox or equivalent statements representing a desired state of the incoming data set.

The various TBox or TBox-equivalent statements of the obtained domain ontology generally capture acceptable or desired (e.g., ideal) properties (e.g., in relation to containment, structure, format, cardinality, and the like) of incoming data elements. In this regard, reference to "TBox" statements throughout this disclosure encompasses both TBox statements and statements that are equivalent to TBox statements. More specifically, each TBox statement may be in the form of a separate piece of metadata describing desired or acceptable properties of incoming data elements such as what data type the incoming data elements should have, whether the data type is required for the incoming data elements to be considered compliant with the TBox statement, what incoming data elements are related to what other incoming data elements, and the like. For instance, the properties may be described in terms of a controlled vocabulary including one or more classes, one or more required and/or optional data types of each class, one or more additional attributes of the data types, and the like, where each of the various classes, data types, attributes, and the like is captured by a separate TBox statement.

For example, the scope of an incoming data set may be determined to include a plurality of employee records such as employee names, associated organizational departments, and the like. In this regard, a domain ontology having a plurality of TBox statements representing acceptable or desired attributes of data of such a scope may be selected. For instance, a first TBox statement "collection" (e.g., a first "TBox") of the domain could include a class of "Employee," (in the form of a TBox statement)required data types of "First Name" and "Last Name," (in the form of 2 different TBox statements) an optional data type of "SSN" (i.e., social security number) (in the form of a TBox statement), and an additional attribute (in the form of a TBox statement) that the incoming data be free of spaces between characters. As another example, a second TBox statement collection of the domain could include a class of "Department" with corresponding required properties of "Name," "Manager" and "ID." The various TBox statements may be organized within the ontology in any appropriate manner (e.g., hierarchically), and a plurality of domain ontologies may be appropriately stored in any appropriate manner (e.g., within any appropriate database(s) and/or file system(s)).

In any event, the utility also includes mapping, using a processing engine, the incoming data set to the obtained domain ontology (e g , linking a schema of the incoming data set with a schema of the obtained domain ontology). That is, as opposed to creating an ontology specific to an incoming data model, the present utility maps the incoming data set to the obtained, established domain ontology (e.g., which broadly presents a model of what the incoming data set should look like). For instance, the incoming data set may include a plurality of tables, and a first of the tables corresponds to "Individual" information, where the data in a first field of each row (e.g., regardless of a specific label for the first fields) corresponds to a "First Name" and the data in a second field of each row (e.g., regardless of a specific label for the first fields) corresponds to a "Last Name."

Here, a decision may initially be made to map the "Individual" data of the incoming data set to the above-discussed "Employee" TBox statement collection of the ontology as being the anticipated or desired structure/format/etc. of the Individual data. For instance, this may entail linking or binding the first field in each row of the "Individual" table to the "First Name" data type of the above-discussed "Employee" TBox statement collection and the second field in each row to the "Last Name" data type. Numerous other manners of mapping for various formats of incoming data are envisioned. In the case of incoming flat files, specific characters of each line could signify the start of a new entry and could be linked or mapped to a particular TBox statement. In the case of incoming XML documents, XPath (a query language for selecting nodes from an XML document) could be used to compute values from an XML document (e.g., strings, numbers, Boolean values) which could be linked to a particular TBox statement of the ontology. It is also envisioned that the capture of links may also occur within the domain ontology.

Once the incoming data set has been mapped to a particular domain ontology, the processing engine determines, for each instance of the incoming data set, whether the instance (e.g., as an ABox statement, i.e., a statement of fact) can be inferred to be compliant with an anticipated TBox statement collection of the domain ontology, and then assesses whether the instance has at least one data quality issue based on an outcome of the determining. Continuing with the above example, an instance of the incoming data set may include the text "John" in the first field of a row and the text "Walker" in the second field of the row. As the first and second fields of each row have been respectively linked to the first name and last name data types of the "Employee" TBox statement collection in this example (e.g., the "expected" or "anticipated" data structure/format/etc.), the utility may determine that the instance can be inferred to be compliant with or otherwise match the expected data types of the mapped TBox statement collection (e.g., because "John" and "Walker" are ABox statements that are compliant with the first name and last name data types of the Employee TBox statement and are free of spaces between characters). Accordingly, the utility may ascertain that the instance is free of data quality issues and move on to the next instance to determine whether it can be inferred into or against an anticipated TBox statement collection.

As another example, another instance of the incoming data set may include the text "George Davis" in the first field of a row and the text "Ryan Keiser" in the second field of the row. Here, absent the Employee TBox statement collection specifying that incoming data must be free of spaces between characters, the utility may, in some situations, infer that the text in the first and second fields is compliant with the First Name and Last Name data types of the Employee TBox statement collection (e.g., as a processor may have no way of knowing that "George Davis" is not a valid first name and "Ryan Keiser" is not a valid last name as both are valid strings). However, due to the "space-free" attribute associated with the Employee TBox statement collection, the utility would likely surmise that George Davis and Ryan Keiser are not ABox statements that are compliant with the First Name and Last Name data types of the Employee TBox statement collection (e.g., because George Davis and Ryan Keiser are not space-free strings).

Upon determining that an instance is unable to be inferred into or otherwise matched against an anticipated or expected TBox statement collection, the utility may conclude that the instance has at least a first data quality issue (e.g., in relation to structure, labeling, and/or the like). In one arrangement, the utility may use the processing engine to increment a statistical count (e.g., by one) that represents a quantity of structural or format issues in the incoming data set (e.g., which may be used by administrators as part of analyzing the data set to rectify quality issues). In another arrangement, the utility may use the processing engine to increment a statistical count that represents a total quantity of instances in the incoming data set (e.g., which may be used along with the structural/format issue statistical count to understand what percentage of the incoming data set is associated with data quality issues).

In one embodiment, the utility may proceed to ascertain which of one or more particular types of data quality issues are associated with the particular instance. For instance, the utility may determine (in any appropriate manner) whether the instance can be inferred into any other TBox statement collections of the domain ontology, and then assess whether the instance has at least a second data quality issue based on an outcome of the determining. Continuing with the above example, another TBox statement collection of the obtained ontology may be a "Department" TBox statement collection having a first required data type of "Name" and a second required data type of "Manager." Here, the utility may be able to respectively infer "George Davis" and "Ryan Keiser" into the first and second required data types of the Department TBox statement collection (e.g., because "George Davis" and "Ryan Keiser" are ABox statements that are compliant with the name and manager data types of the Department TBox statement collection).

For instance, the utility may ascertain that data quality issue associated with the particular instance is really a labeling problem (e.g., the "George Davis" and "Ryan Keiser" portions of text in the particular instance were inadvertently entered into the "First Name" and "Last Name" fields of the "Individual" table or section of the incoming data set instead of a "Department" table or section of the incoming data set) as opposed to a structural/format problem and use the processing engine to increment a statistical count that represents a quantity of labeling issues in the incoming data set (e.g., which may be used by administrators as part of analyzing the data set to rectify quality issues). In one arrangement, a statistical count associated with structural/format problems may be decremented by one in the event that the structural/format statistical count was initially incremented by one in relation to this particular instance. For example, the successful inferencing of the instance into the Department TBox statement collection may indicate that the data quality issue is in relation to labeling as opposed to structure/format (e.g., such as not including data corresponding to a required data type of a TBox statement collection).

The various aspects discussed herein may be implemented via any appropriate number and/or type of platforms, modules, processors, memory, etc., each of which may be embodied in hardware, software, firmware, middleware, and the like. Various refinements may exist of the features noted in relation to the various aspects. Further features may also be incorporated in the various aspects. These refinements and additional features may exist individually or in any combination, and various features of the aspects may be combined. In addition to the exemplary aspects and embodiments described above, further aspects and embodiments will become apparent by reference to the drawings and by study of the following descriptions.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Reference will now be made to the accompanying drawings, which assist in illustrating the various pertinent features of the various novel aspects of the present disclosure. In this regard, the following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1:
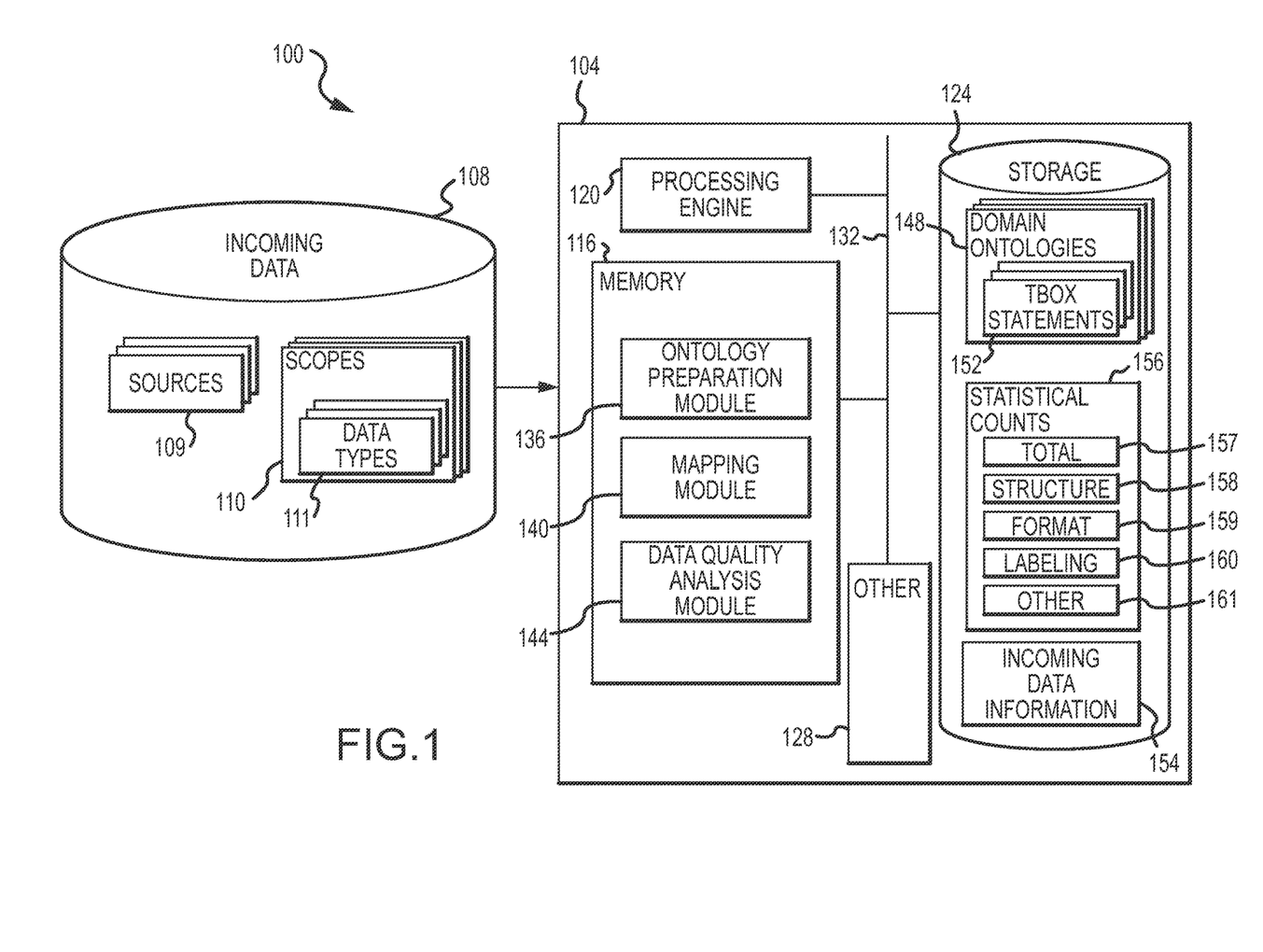
FIG. 1 illustrates one embodiment of a system operable to perform automated detection of data quality issues for one or more sets of incoming data.

FIG. 1 illustrates a functional block diagram of a system 100 that is broadly operable to reduce the time and effort that would otherwise be required to generate tools for use in validating data (e.g., information, knowledge, etc.) and allow for the automation and reuse of the validation tools once the tools have been generated or otherwise obtained. As will be discussed in more detail in the discussion that follows, data quality issue detection may be automated through an initial mapping of a schema (e.g., data structure) of an incoming data set to a corresponding schema (e.g., including a plurality of TBox statements) of a domain ontology which represents a desired or acceptable structure of the incoming data. Data quality issues may then be detected based on whether the incoming data structures (e.g., instances of the incoming data set that become potential ABox statements) can be matched to or otherwise inferenced as the acceptable data structures (e.g., one or more properties of an anticipated TBox statement collection) or other data structures of the ontology.

The system 100 may include at least one server 104 that broadly processes incoming data 108 (e.g., originating either within the server 104 or outside of the server 104 and communicated to the server 104 over one or more appropriate networks) using one or more modules (either individually or in combination) to detect one or more types of data quality issues (e.g., where the detected data quality issues may be used in subsequent cleansing of such data). Although shown as a single device (e.g., laptop, desktop, mobile device, and/or other computing device), one or more functionalities, processes or modules of the server 104 may be allocated among a plurality of machines, devices and/or processes which may or may not be embodied in a single housing. In one arrangement, functionalities of the server 104 may be embodied in any appropriate cloud or distributed computing environment.

The server 104 may include memory 116 (e.g., one or more RAM or other volatile memory modules), a processing engine or unit 120 (e.g., one or more CPUs) for executing computer readable instructions from the memory 116, storage 124 (e.g., one or more magnetic disks or other non-volatile memory modules), and/or a number of other components 128 (e.g., input devices such as a keyboard and mouse, output devices such as a display and speakers, and the like), all of which may be appropriately interconnected by a system bus 132. While not shown, the server 104 may include any appropriate number and arrangement of interfaces that may facilitate interconnection between the system bus 132 and the various components of the server 104 as well as with other devices.

As shown, the memory 116 may include a number of programs or modules (each including one or more sets of computer-readable instructions for execution by the processing unit 120) that may be accessed by users in any appropriate manner to perform automated data quality detection of incoming data 108. In one arrangement, any appropriate dashboard in communication with the various below-described modules may run on the server 104 and be accessible by administrators, troubleshooters, management and/or other users to observe or otherwise perceive a relative level of data quality issues in an incoming data set, perform mapping between ontologies and incoming data sets, and the like. In another arrangement, any appropriate portal in communication with the various below-described modules may run on the server 104 and be accessible by users (e.g., via any appropriate browser) to access the functionalities of the server 104.

Before discussing the various modules of the server 104 in more detail, reference will be made to the incoming data 108 which will be analyzed by the server 104 for detection of data quality issues existing in the incoming data 108. As shown, incoming data 108 may originate from one or more sources 109 (e.g., flat files, XML files, databases, and the like) and encompass one or more scopes 110, each including one or more data types 111. For instance, and turning to FIG. 4, a representative (e.g., potential) incoming data set 400 associated with any appropriate source 109 is illustrated and includes a number of instances 404, 408, 412, 416 (e.g., in the form of groups, sets, rows, strings, etc. of data). In this example, the instances include: a first instance 404 that includes a "class" entry 405 of "Individual," a "First Name" entry 406 of "Mark," and a "Last Name" entry 407 of "Smith;" a second instance 408 that includes a "class" entry 409 of "Employee," a "First Name" entry 410 of "John," and a "SSN" entry 411 of "123-45-6789;" a third instance 412 that includes a "class" entry 413 of "Department," a "Full Name" entry 414 of "Bob," and a "Location" entry 415 of "Evans;" up to an nth instance 416 having a class entry 417 and one or more other entries 418. Here, a scope 110 of the incoming data set 400 may be determined (e.g., in any appropriate manner, such as manually or automatically perusing the instances 404, 408, 412, 416) to be an organization's employee directory including data types 111 such as employee information, departmental information, and the like. As another example, a scope 110 of another incoming data set could be the movement of goods within an organization including data types 111 such as part numbers, shipped and received part quantities and locations, and the like. Numerous other examples of incoming data sets are envisioned and encompassed within the present disclosure.

Returning to FIG. 1, the server 104 may include an ontology preparation module 136 that is generally operable to determine or at least obtain the scopes 110 of one or more sets of incoming data 108 and generate or at least obtain and store one or more corresponding domain ontologies 148 each having a plurality of TBox statements 152 representing "acceptable" or desired properties of the incoming data such as, but not limited to, formats, structures, ranges, and the like. The server 104 may also include a mapping module 140 that is generally operable to map or link specific data structures (e.g., fields, rows, etc.) of incoming data 108 to one or more anticipated TBox statements 152 of a particular domain ontology 148, and a data quality analysis module 144 that is generally operable to detect data quality issues in instances of incoming data 108 based on whether or not the instances can be inferred against or otherwise be matched to corresponding anticipated TBox statements 152 or one or more other TBox statements 152.

Figure 2:
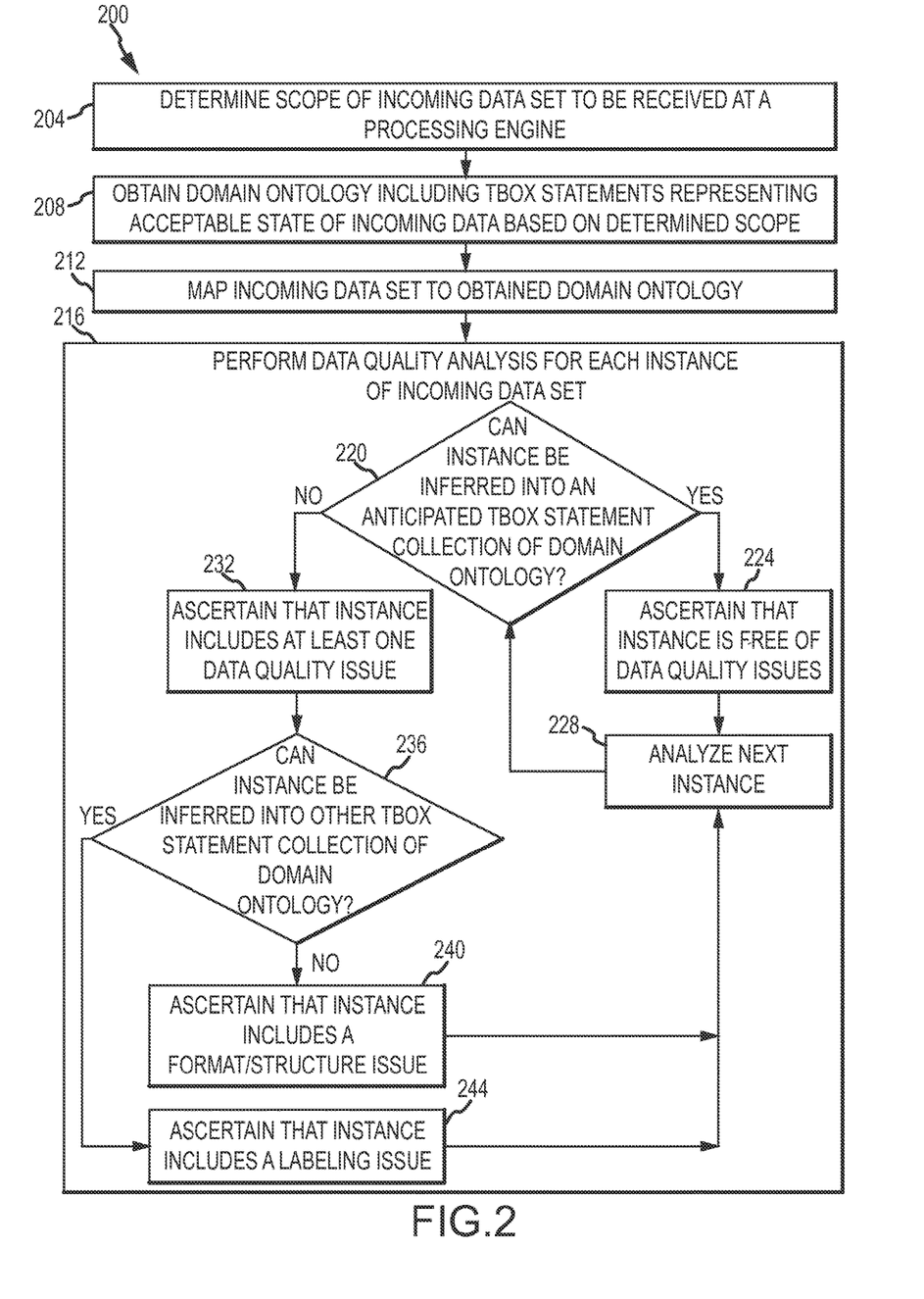
FIG. 2 is a flow diagram illustrating one embodiment of a method for use in performing the automated detection of data quality issues for one or more sets of incoming data.

To facilitate the reader's understanding of various modules of the server 104, reference is now made to FIG. 2 which illustrates a method 200 for use in performing the automated detection of data quality issues in a set of incoming data 108 (where the method 200 is collectively represented by the ontology preparation module 136, the mapping module 140 and the data quality analysis module 144). While specific steps of the method 200 will be discussed, other methods (including more, fewer or different steps than those illustrated) consistent with the teachings presented herein are also envisioned and encompassed within the present disclosure. The method 200 may begin by determining 204 a scope of an incoming data set that is to be received at a processing engine for detection of potential data quality issues. As an example, and as discussed above in relation to FIG. 4, a scope 110 of an incoming data set 400 may be determined or obtained in any appropriate manner and may include data types 111 such as employee information (e.g., first names, last names, etc.), departmental information (e.g., names, managers, etc.), and the like. Any appropriate information 154 in relation to the incoming data set 400 may be stored in the server 104, such as the incoming data set 400 itself, the scope of the incoming data set 400, the size of the incoming data set 400, where the incoming data set 400 is coming from, a reference to the below-discussed domain ontology 148 obtained for the incoming data set 400, and/or the like).

Figure 3:
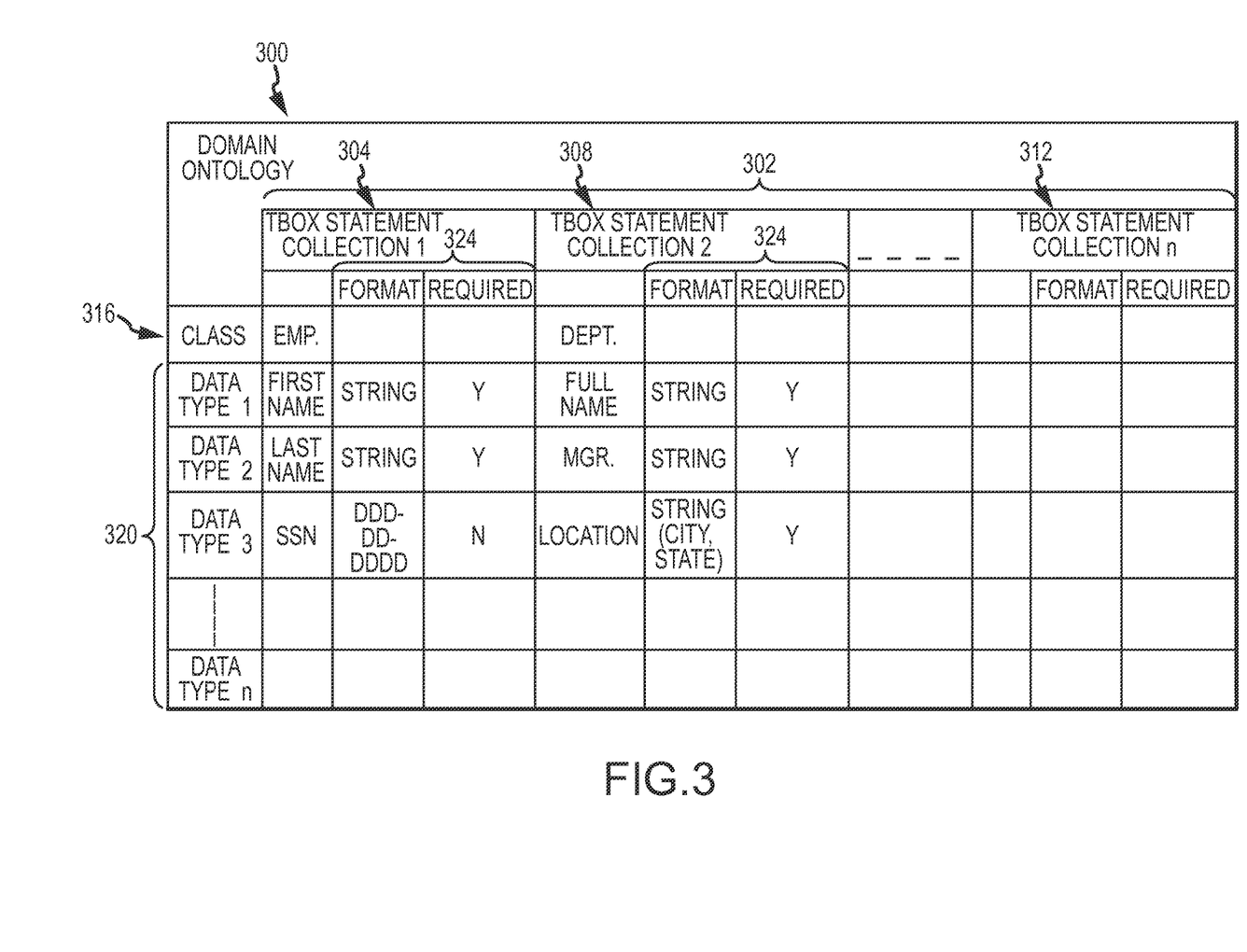
FIG. 3 illustrates a domain ontology data structure for use in performing the automated detection of data quality issues for one or more sets of incoming data.

The method 200 may then include obtaining 208 a domain ontology 148 that includes TBox statements 152 representing acceptable (e.g., ideal) attributes or features of the incoming data set (e.g., formats, structures, ranges, and the like) at least generally based on the determined scope. Turning now to FIG. 3, a representative domain ontology (e.g., data structure) 300 is shown that may be used to detect data quality issues in various types of incoming data 108. The domain ontology 300 may include a plurality of TBox statement collections 302 such as first and second TBox statement collections 304, 308 up to an nth TBox statement collection 312. Each of the TBox statement collections 302 may include a "class" 316 in addition to one or more "data types" 320 that may be used to determine whether an instance of the incoming data set, as a statement of fact (e.g., an ABox statement), is compliant with and thus can be inferenced into the particular TBox statement collection 302.

In this example, the first TBox statement collection 304 includes a class 316 of "Employee" along with data types 320 of "First Name," "Last Name," and "SSN" (social security number) while the second TBox statement collection 308 includes a class 316 of "Department" along with data types 320 of "Full Name," "Manager" and "Location." Each of the TBox statement collections 302 may also include any appropriate attributes or features 324 of the data types 320 (e.g., required formats of incoming data instances in order to be considered to match the property, whether the property is required to be met in order for the instance to be determined to match the TBox statement collection 302, etc.). For example and as shown, the first TBox statement collection 304 may include a "format" attribute 324 that requires, in order for a data instance to match or be inferred into the TBox statement collection 304, a "First Name" and "Last Name" of the data instance to each be in the form of a string and a "SSN" of the data instance to be in "DD-DDD-DDDD" format. As another example, the first TBox statement collection 304 may include an attribute 324 that specifies whether or not the property is required in order for an incoming data instance to match or be inferred against the first TBox statement collection 304. As shown, the First Name and Last Name data types 320 of the first TBox statement collection 304 are required while the SSN data types 320 is not required (e.g., it is optional).

Advantageously, each domain ontology 148 (e.g., such as the domain ontology 300) is highly scalable which allows for use across multiple domains as opposed to the currently-existing and proprietary rules-based detection engines that are limited in their degree of portability across disparate data domains. For instance, administrators and other users can easily customize domain ontologies 148 by way of adding or removing TBox statements 152, modifying TBox statements 152, and the like. In some arrangements, it is envisioned that an ontology 148 could be obtained 208 or generated prior to each respective time that incoming data 108 is to be analyzed for data quality issues. In other arrangements, a plurality of ontologies 148 could be generated for use with a plurality of varying types of potential incoming data 108, whereby a particular ontology 148 could be obtained 208 for use in data quality analysis of a corresponding set of incoming data 108. In any case, it is envisioned that each domain ontology 148 may be reused for detecting data quality issues among a plurality of various incoming data sets.

With continued reference to FIG. 2, the method 200 may also include mapping 212 the incoming data set (e.g., incoming data set 400 of FIG. 4) to the obtained domain ontology (e.g., domain ontology 300 of FIG. 3). More specifically, the mapping 212 may entail linking specific data structures in the incoming data set to particular TBox statements 152 of the obtained domain ontology 148. For instance, structures allegedly corresponding to employee data in the incoming data set 400 may be linked to the first TBox statement collection 304 of the domain ontology 300 in FIG. 3 (e.g., where the first TBox statement collection 304 constitutes an "anticipated" TBox statement collection of the employee data) and structures allegedly corresponding to departmental data in the incoming data set 400 may be linked to the second TBox statement collection 308 of the domain ontology 300 in FIG. 3 (e.g., where the second TBox statement collection 308 constitutes an "anticipated" TBox statement collection of the departmental data).

Furthermore, and as discussed previously, incoming data 108/400 may originate from a variety of different sources 109 such as, but not limited to, databases, flat files, XML files, and the like. In the case of an incoming database, for instance, the mapping 212 could entail linking particular fields of each row of the database to one or more TBox statements 152/302. In the case of incoming flat files, the mapping 212 could include linking specific characters of each line that signify the start of a new entry to one or more particular TBox statements 152/302. In the case of incoming XML documents, the mapping 212 could include linking values computed by XPath from the XML document (e.g., strings, numbers, Boolean values) to one or more particular TBox statements 152/302 of the ontology. Numerous other manners of mapping for various formats of incoming data are envisioned.

The method 200 may then proceed to perform 216 a data quality analysis for each instance of the incoming data set. As seen in FIG. 2, the performing 216 may query 220 whether an instance of the incoming data set (e.g., as an ABox statement) can be inferred into (e.g., matched to, determined to be compliant with, etc.) a corresponding anticipated TBox statement collection (e.g., where the instance is expected to comply with the corresponding anticipated TBox statement collection). For instance, assume that the method 200 queries 220 whether the first instance 404 in FIG. 4 can be inferred into the first TBox statement collection 304 in FIG. 3. Here, the method 200 may, for instance, compare the First Name entry 406 of "Mark" in the first instance 404 to the First Name data type 320 of the first TBox statement collection 304 and determine whether the entry "Mark" matches or is otherwise compliant with the First Name data type 320. For instance, if "Mark" is in the form of a string and is considered to be a first name (which, in this case, it likely would), then the first instance 404 could be considered compliant with the First Name data type 320 of the first TBox statement collection 304. A similar process could be performed for the Last Name entry 407 of "Smith," a result of which would likely result in the first instance 404 being considered compliant with the Last Name data type 320 as well. While the first TBox statement collection includes an SSN data type 320 in this example (see FIG. 4), it is not specified in the first TBox statement collection 304 to be a required property. As the first instance 404 in this example may thus be determined to be inferenced into or otherwise match or be compliant with the first TBox statement collection 304, the method 200 may ascertain 224 that the first instance 404 is free of data quality issues and proceed to analyze 228 the next instance of the incoming data set.

In one arrangement, the server 104 may maintain statistical counts 156 of various metrics related to the automated data quality detection which may be used by administrators and other personnel as part of analyzing results or performing cleansing of corrupted data or data that is otherwise determined to have one or more data quality issues. With reference to FIG. 1, the server 104 may store a number of statistical counts 156 such as a "Total Instances Processed" statistical count 157, an "Instances with Structural Issues" statistical count 158, an "Instances with Formatting Issues" statistical count 159, an "Instances with Labeling Issues" statistical count 160, and/or one or more other statistical counts 161. For instance, for each instance of the incoming data set on which a data quality analysis is performed 216, the method 200 may proceed to increment the statistical count 157 by one (or other appropriate value).

In any case, responsive to a negative determination at 220, the method 200 may flow to 232 and ascertain that the instance includes at least one data quality issue. For instance, and turning back to FIGS. 3-4, an attempt to inference the second instance 408 into the first TBox statement collection 304 would fail at least because it lacks an entry that would be compliant with the Last Name data type 320. Thus, after ascertaining 232 that the second instance 408 includes at least one data quality issue (e.g., due to its failure to be inferenced into its anticipated TBox statement collection, the first TBox statement collection 304), the method 200 may proceed to query 236 whether the second instance 408 can be inferenced into any other TBox statement collections of the ontology 300, such as the second TBox statement collection 308.

Figure 4:
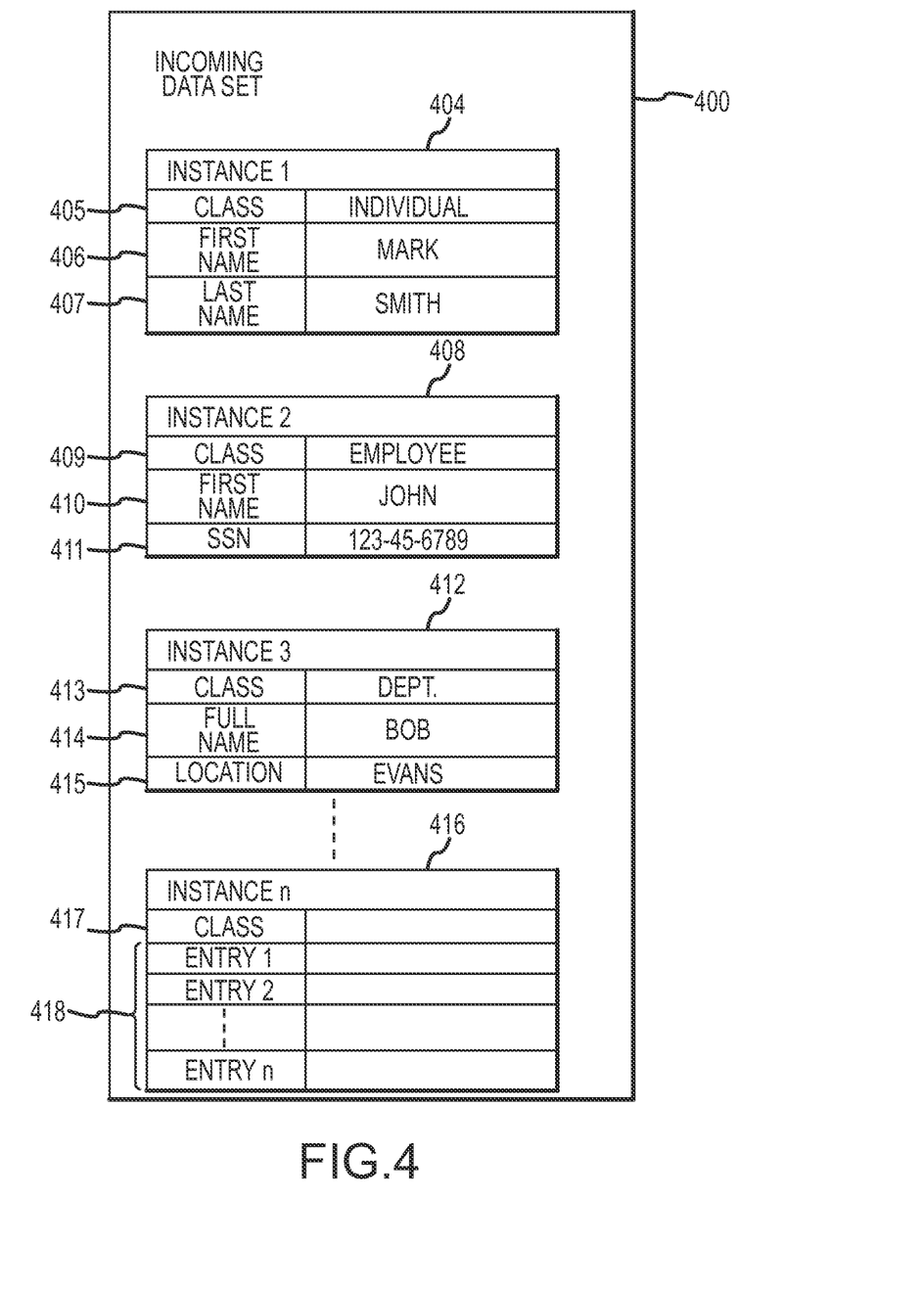
FIG. 4 illustrates several representative instances of an incoming set of data on which the automated data quality issue detection utilities disclosed herein may be performed.

For instance, the second TBox statement collection 308 in FIG. 3 includes "Full Name," "Manager" and "Location" data types 320, all of which are in string formats and are required in order for an instance to match the second TBox statement collection 308. Here, the second instance 408 likely cannot be inferenced into the second TBox statement collection 308 because it does not include entries that could match or otherwise comply with the Full Name, Manager and Locations data types 320 of the second TBox statement collection 308. In the event that the second instance 408 could not be inferenced into any other TBox statement collections 302 of the ontology 300, the method 200 may ascertain 240 that the second instance 408 includes a format and/or structural issue (e.g., because it is missing a portion required by a required property of the second TBox statement collection 308), and then analyze 228 the next instance in the incoming data set. In one arrangement, the method 200 may proceed to increment one or both of the statistical counts 158, 159 by one in response to ascertaining 240 that the instance includes a formatting and/or structural issue.

In the event that an instance can be inferenced into another TBox statement collection at 236, the method 200 may ascertain 244 that the instance includes a labeling issue (as opposed to a structural or formatting issue) and then analyze 228 the next instance in the incoming data set. For instance, assume the method 200 initially queries 220 whether the third instance 412 in FIG. 4 can be inferenced into the second TBox statement collection 308, where the second TBox statement collection 308 corresponds to an "anticipated" TBox statement collection of the third instance 412 (e.g., due to both the third instance 408 and the second TBox statement collection 308 being associated with a "Department" class). Here, the query at 220 would likely fail as the third instance 412 fails to include an entry that would be compliant with the "Full Name" data types 320 of the second TBox statement collection 308 (despite the entry "Bob" being labeled as "Full Name," see FIG. 4) and because the third instance 412 fails to include an entry that would be compliant with the "Location" data type 320 (there is no entry in the third instance in the form of "city, state").

After a negative determination at 220 and ascertaining 232 that the third instance includes at least one data quality issue, the method 200 may proceed to determine 236 whether the third instance 412 can be inferenced into any other TBox statement collections, such as the first TBox statement collection 304. Here, the entry "Bob" would likely be compliant with the First Name data type 320 of the first TBox statement collection 304 (despite the mislabeling of the entry "Bob" as being a "Full Name" in the instance 400) and the entry "Evans" would likely be compliant with the Last Name data type 320 of the first TBox statement collection 304 (despite the mislabeling of the entry "Evans" as being a "Location"). Thus, the method 200 may ascertain 244 that the third instance is associated with a labeling issue and move to analyze 228 the next instance in the incoming data set.

In one arrangement, the method 200 may proceed to increment the statistical count 160 responsive to the ascertaining at 244. In another arrangement, the method 200 may, after incrementing the statistical count 160, correspondingly decrement one or both of the statistical counts 158, 159. For instance, some embodiments envision that one or both of the statistical counts 158, 159 may be incremented responsive to ascertaining 232 that the instance includes at least one data quality issue (e.g., before querying 236 whether the instance can be inferenced into one or more other TBox statements of the ontology). In other words, determination at 232 that an instance includes at least one data quality issue may initially default to a determination that the data quality issue is in relation to format or structural issues. However, upon ascertaining at 244 that the data quality issue is really a labeling issue (e.g., as discussed above in relation to the third instance 412), the method 200 may increment the labeling issue statistical count 160 while decrementing one or both of the formatting/structural issue statistical counts 158, 159. In one variation, any labeling issue may also necessarily connote a structural and/or formatting issue in which case each of the statistical counts 158-160 would be incremented.

Deviations may be made from the specific embodiments disclosed in the specification without departing from the spirit and scope of the invention. For example, at least some of the functionalities performed by many of the processes and modules discussed herein may be performed by other modules, devices, processes, etc. The illustrations and discussion herein has only been provided to assist the reader in understanding the various aspects of the present disclosure.

As also discussed previously, the various engines, managers, modules, and the like disclosed herein may be in the form of any appropriate combination of hardware, software, middleware, firmware and/or the like operable to carry out the various functionalities disclosed herein. For instance, such software, middleware and/or firmware may be implemented as one or more computer program products, i.e., one or more modules of computer program instructions encoded on a computer-readable medium for execution by one or more processors or processing modules, or to control the operation of, one or more data processing apparatuses. For example, the modules and tools in the server 104 may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. In addition to hardware, the system 100 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide the various online, open source information collection and analysis functionalities disclosed herein) may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In some embodiments, the system 100 (e.g., the server 104, etc.) may include one or more of various types of devices, including, but not limited to a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer (e.g., the server 104) having a display device (e.g., a CRT (cathode ray tube) or LCD (liquid crystal display) monitor), for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for use in detecting data quality issues in one or more instances of an incoming set of data, the method comprising:
    determining a scope of an incoming data set to be receivable at a processor, wherein said determining a scope of the incoming data set comprises automatically perusing a plurality of instances of data structures comprising the incoming data set, and wherein each instance includes one or more entries;
    obtaining, based on the determined scope, a domain ontology that includes a plurality of TBox statement collections that collectively comprise metadata describing desired or acceptable properties of data corresponding to the determined scope, and wherein the metadata in each TBox statement collection describes a) a plurality of data types, b) at least one format that each data type should have, and c) an indication of whether or not each format is required in order for the data to be considered compliant with the TBox statement collection, wherein at least one of the formats of at least one of the data types is indicated as being required in order for the data to be considered compliant with the TBox statement collection;
    mapping, using the processor, the incoming data set to the domain ontology, wherein said mapping comprises linking specific data structures in the incoming data set to particular TBox statement collections of the obtained domain ontology; and
    for each instance of the incoming data set:
        identifying an anticipated TBox statement collection of the plurality of TBox statement collections of the domain ontology;
        ascertaining, using the processor, whether the instance can be inferenced into the anticipated TBox statement collection of the domain ontology, wherein the instance can be inferenced into the anticipated TBox statement collection when the instance comprises an ABox statement that is compliant with the anticipated TBox statement collection, wherein the instance comprises an ABox statement that is compliant with the anticipated TBox statement collection when at least one data structure in the instance is the at least one of the data types having the at least one of the required formats;
        determining, by the processor, that the instance is free of at least one data quality issue responsive to the instance being inferenced into the anticipated TBox statement collection; and
        determining, by the processor, that the instance has at least one data quality issue responsive to the instance not being inferenced into the anticipated TBox statement collection, wherein when the processor determines that the instance has at least one data quality issue, the method further includes ascertaining whether the instance can be inferenced into any other TBox statement collections of the domain ontology, and wherein the processor:
            determines that the at least one data quality issue comprises a structural and/or formatting issue associated with the instance when it is ascertained that the instance cannot be inferenced into any other TBox statement collections of the domain ontology; and
            determines that the at least one data quality issue comprises a labeling issue associated with the instance when it is ascertained that the instance can be inferenced into another TBox statement collection of the domain ontology.

2. The method of claim 1, further comprising:
    incrementing, using the processor, a statistical count that represents a quantity of structural, format, and/or labeling issues in the incoming data set responsive to ascertaining that the type of the at least one data quality issue comprises a structural, formatting, and/or labeling issue associated with the instance.

3. The method of claim 1, further comprising:
    incrementing, using the processor, a statistical count that represents a total quantity of instances in the incoming data set.

4. The method of claim 1, wherein the linking comprises:
    binding at least one of a particular character or field of each data segment of an incoming data set to a particular property of the anticipated TBox statement collection.

5. The method of claim 4, wherein each segment comprises a row of data.

6. The method of claim 4, wherein the determining comprises:
    comparing the particular character or field of the instance to the particular bound property of the anticipated TBox statement collection.

7. A system for use in detecting data quality issues in one or more instances of an incoming set of data, the system comprising:
    a processor; and
    a memory logically connected to the processor and comprising a set of computer readable instructions executable by the processor to:
        determine a scope of an incoming data set to be receivable at the processor, wherein the scope of the incoming data set is determined by automatically perusing a plurality of instances comprising the incoming data set, wherein each instance includes one or more entries;
        obtain, based on the determined scope, a domain ontology that includes a plurality of TBox statement collections that collectively comprise metadata describing desired or acceptable properties of data elements corresponding to the determined scope, and wherein the metadata in each TBox statement collection describes a) a plurality of data types, b) at least one format that each data type should have, and c) an indication of whether or not each format is required in order for the data to be considered compliant with the TBox statement collection, wherein at least one of the formats of at least one of the data types is indicated as being required in order for the data to be considered compliant with the TBox statement collection;

map the incoming data set to the domain ontology, wherein the incoming data set is mapped to the domain ontology by linking specific data structures in the incoming data set to particular TBox statement collection of the obtained domain ontology; and for each instance of the incoming data set:
identify an anticipated TBox statement collection of the plurality of TBox statement collections of the domain ontology;

ascertain whether the instance can be inferred into the anticipated TBox statement collection of the domain ontology, wherein the instance can be inferenced into the anticipated TBox statement collection when the instance comprises an ABox statement that is compliant with the anticipated TBox statement collection, wherein the instance comprises an ABox statement that is compliant with the anticipated TBox statement collection when at least one data structure in the instance is the at least one of the data types having the at least one of the required formats;

determine that the instance is free of at least one data quality issue responsive to the instance being inferenced into the anticipated TBox statement collection; and determine that the instance has at least one data quality issue responsive to the instance not being inferenced into the anticipated TBox statement collection, wherein when it is determined that the instance has at least one data quality issue, the set of computer readable instructions are further executable by the processor to ascertain whether the instance can be inferenced into any other TBox statement collections of the domain ontology, and wherein the set of computer readable instructions are further executable by the processor to:

determine that the at least one data quality issue comprises a structural and/or formatting issue associated with the instance when it is ascertained that the instance cannot be inferenced into any other TBox statement collections of the domain ontology; and determine that the at least one data quality issue comprises a labeling issue associated with the instance when it is ascertained that the instance can be inferenced into another TBox statement collection of the domain ontology.

8. The system of claim 7, wherein the computer readable instructions are further executable by the processor to:
increment a statistical count that represents a quantity of structural, format, and/or labeling issues in the incoming data set responsive to ascertaining that the type of the at least one data quality issue comprises a structural, formatting, and/or labeling issue associated with the instance.

9. The system of claim 7, wherein the computer readable instructions are further executable by the processor to:
increment a statistical count that represents a total quantity of instances in the incoming data set.

10. The system of claim 7, wherein the computer readable instructions executable by the processor to link comprise instructions executable by the processor to:
bind at least one of a particular character or field of each data segment of an incoming data set to a particular property of the anticipated TBox statement collection.

11. The system of claim 10, wherein each segment comprises a row of data.

12. The system of claim 10, wherein the computer readable instructions executable by the processor to determine comprise instructions executable by the processor to:
compare the particular character or field of the instance to the particular bound property of the anticipated TBox statement collection.

13. A non-transitory computer-readable storage medium storing computer-readable instructions, which when executed by a processor, cause the processor to perform a method that comprises:

determining a scope of an incoming data set to be receivable at the processor, wherein said determining a scope of the incoming data set comprises automatically perusing a plurality of instances of data structures comprising the incoming data set, and wherein each instance includes one or more entries;

obtaining, based on the determined scope, a domain ontology that includes a plurality of TBox statement collections that collectively comprise metadata describing desired or acceptable properties of data corresponding to the determined scope, and wherein the metadata in each TBox statement collection describes a) a plurality of data types, b) at least one format that each data type should have, and c) an indication of whether or not each format is required in order for the data to be considered compliant with the TBox statement collection, wherein at least one of the formats of at least one of the data types is indicated as being required in order for the data to be considered compliant with the TBox statement collection;

mapping the incoming data set to the domain ontology, wherein said mapping comprises linking specific data structures in the incoming data set to particular TBox statement collections of the obtained domain ontology; and for each instance of the incoming data set:
identifying an anticipated TBox statement collection of the plurality of TBox statement collections of the domain ontology;

ascertaining whether the instance can be inferenced into the anticipated TBox statement collection of the domain ontology, wherein the instance can be inferenced into the anticipated TBox statement collection when the instance comprises an ABox statement that is compliant with the anticipated TBox statement collection, wherein the instance comprises an ABox statement that is compliant with the anticipated TBox statement collection when at least one data structure in the instance is the at least one of the data types having the at least one of the required formats;

determining that the instance is free of at least one data quality issue responsive to the instance being inferenced into the anticipated TBox statement collection; and determining that the instance has at least one data quality issue responsive to the instance not being inferenced into the anticipated TBox statement collection, wherein when the processor determines that the instance has at least one data quality issue, the method further includes ascertaining whether the instance can be inferenced into any other TBox statement collections of the domain ontology, and wherein the set of computer readable instructions when executed by the processor further cause the processor to:

determine that the at least one data quality issue comprises a structural and/or formatting issue associated with the instance when it is ascertained that the instance cannot be inferenced into any other TBox statement collections of the domain ontology; and determine that the at least one data quality issue comprises a labeling issue associated with the instance when it is ascertained that the instance can be inferenced into another TBox statement collection of the domain ontology.

\* \* \* \* \*